United States Patent [19]
Johnson

[11] 4,179,148
[45] Dec. 18, 1979

[54] SNAP HOOK

[76] Inventor: Robert J. Johnson, 3245 Virginia St., No. 2, Coconut Groove, Fla. 33133

[21] Appl. No.: 924,651

[22] Filed: Jul. 14, 1978

[51] Int. Cl.² .............................................. B66C 1/36
[52] U.S. Cl. ................................ 294/78 R; 24/115 G; 24/132 AA; 24/231; 24/234; 294/82 R
[58] Field of Search ................. 294/78 R, 82 R, 83 R; 24/115 R, 115 G, 115 CH, 132 R, 132 AA, 133, 134 R, 134 KB, 230.5 R, 231, 234, 241 P, 241 S, 241 SP; 114/108, 249; 403/330

[56] References Cited
U.S. PATENT DOCUMENTS

| 983,404 | 2/1911 | Schartow | 24/234 |
| 1,229,690 | 6/1917 | Waskom | 24/134 R |
| 2,942,315 | 6/1960 | Johnson | 24/134 R |
| 2,992,465 | 7/1961 | Gale | 294/78 R |
| 2,995,332 | 8/1961 | Davis | 24/134 R X |
| 2,998,625 | 9/1961 | Huber | 24/134 R |
| 3,698,047 | 10/1972 | Pierce | 294/83 R X |

*Primary Examiner*—Johnny D. Cherry

[57] ABSTRACT

An improved snap hook of the type having a hook and rigidly fixed eye extending from the hook and a swingable keeper arm connected on the hook, and having a foot portion normally spring-urged into blocking relation of the passage through the eye of the hook and wherein the foot includes a surface arranged to bite into a line passed through the eye in one direction of rotation and yieldable storing energy in the spring upon movement of the line in the other direction of rotation to bitingly and clampingly engage the line automatically against applied forces tending to move the line in the direction in which it is to be restrained.

10 Claims, 4 Drawing Figures

SNAP HOOK

FIELD OF THE INVENTION

This invention relates to snap hooks and, more particularly, to a snap hook having a keeper arm with a foot designed to clampingly engage a line passed through an eye provided in the snap hook.

BACKGROUND OF THE INVENTION

In the past snap hooks have been used commonly, for example, in boating. This invention is of an improved snap hook. As can be appreciated, there is always need for improvement of the means of handling ropes and lines in the maritime industry and for pleasure boating as well; and this has presented long-outstanding problems in the art. This invention is of an improved snap hook which is simple and easy to apply and positive in action once installed.

Generally speaking, this invention is of an improved snap hook which includes a keeper arm which is spring-loaded so that a rope or line can be passed through the fixed eye of the snap hook by pivotal movement of the keeper arm and a foot included on the keeper arm into and out of blocking and clamping relation of a line passed through the eye of the snap hook. The action of the keeper arm with respect to a line passed through it, to be described more fully hereinafter, is releaseable or yieldable in one direction of movement of the line relative to the snap hook but in response to movement in an opposite direction, the foot on the keeper arm will bite clampingly against the line pinching it or trapping it between the eye of the snap hook and the keeper arm foot. As additional pull takes place on the line, the amount of holding power will increase yet, in response to pull of the line in the opposite direction, the keeper arm and foot will yieldingly move permitting free passage of the line through the eye.

It will be readily appreciated that the instant invention may be utilized in many applications particularly in the boating industry, as well as in trucking, warehousing and situations where a quick positive means of securing a cargo or the like is desired and where it is necessary to quickly release the load in one direction yet hold it tightly and securely against forces applied in the other direction. For example, at docks in response to various levels of tides, this device supplies rapid, simple and convenient means for adjusting the amount of line between a buoyant body moored to a dock and the shoreline. Also, the device is useful in towing a boat or dinghy as is often done with a tow line. Other applications may be in emergency repairs where it is necessary to rapidly connect an item to a line so that the repair can be expeditiously handled. Finally, tying down items on decks of ships and other vehicles may be accomplished rapidly by using the instant invention and a line running through the eye of the improved snap hook so that it may be secured tightly against shifting, for example, and, when it is desired to remove the line, the same may be rapidly removed.

Generally, it will be appreciated that the instant invention can be used in any situation in which conventional snap hooks are used but with the added advantage that a line passing through the eye is most effectively restrained against one direction of movement yet freely movable in another direction opposite to the direction of movement in which it is trapped.

OBJECTS OF THE INVENTION

It is, accordingly, an object of this invention to provide an improved snap hook to automatically open and close which is provided with a keeper arm so that a line passed through the eye of the snap hook is adapted to be clampingly engaged against movement in one direction through the eye and is yieldable to movement of the line in an opposite direction through the line.

It is another object of this invention to provide an improved snap hook structure of the type described wherein the keeper arm is provided with a foot having an abutment surface arranged to clampingly engage and bite into the surface of a line passing through the eye when the line is moved through the eye in a first direction of rotation and yieldable to movement of the line in an opposite direction.

It is a general object of this invention to provide a snap hook of the type including a keeper arm swingably mounted thereto which is of improved construction and structure and which is simple and inexpensive to manufacture and otherwise well adapted for the purposes which are set forth more fully hereinafter.

In accordance with these and other objects which will become apparent hereinafter, the instant invention will now be described with reference to the accompanying drawings in which:

DESCRIPTION OF THE PREFERRED EMBODIMENT

Figure 1:
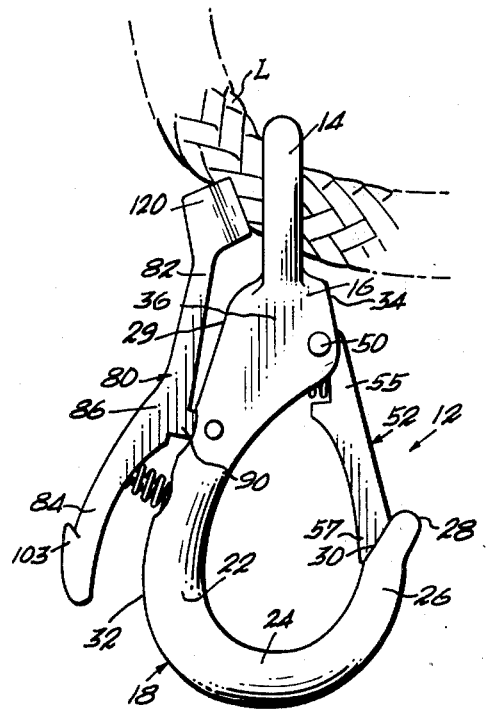
FIG. 1 is a side elevation view, which is inverted, for purposes of description hereinafter, and which illustrates the improved snap hook.

Referring to the drawings wherein like reference characters designate like or corresponding parts throughout the several views and referring particularly to FIG. 1 there is a snap hook generally designated by the numeral 12 which includes an eye portion 14 connected by a zone of juncture 16 to a snap hook generally designated by the numeral 18. A line L is passed through an opening 20 in the eye portion of the snap hook 12. The hook portion 18 includes a first leg 22 extending generally axially away from the zone of juncture 16 between the eye and the snap hook portion and a U-shaped bite portion 24 arcuately curved and terminating in a second hook leg portion 26 spaced from the first leg portion 22 and having a terminal end 28 with an abutment surface 30 generally confronting the leg portion 22 of the hook.

Figure 2:
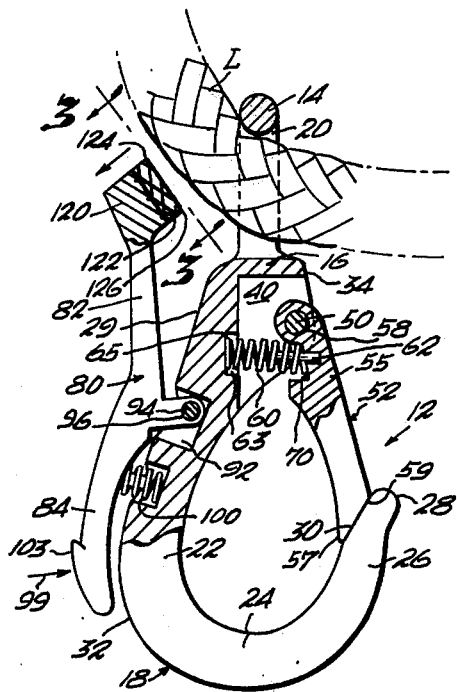
FIG. 2 is a view similar to FIG. 1 and illustrating operation of the improved snap hook, which has been partially broken away for purposes of illustration.

For purposes of reference, the zone of juncture 16 has a first surface 29 which is common with the surface 32 of the first leg portion and an opposite surface 34 and a pair of outer surfaces 36 and 38. A recess 40 which may be conveniently referred to as a first recess is provided in the zone of juncture 16, see FIG. 2, between the surfaces 36 and 38 extending depthwise from the surface 34 towards the surface 29. Spanning the recess 40 in the preferred embodiment there is a first pin 50 extending between the outer surfaces 36 and 38 in generally perpendicular relation.

The snap hook is provided with a swingable latch arm generally designated by the numeral 52 which is of a length greater than the distance between the pin 50 in the recess 40 and the terminal end zone 28 of the hook. For purposes of references the latch arm 52 may be considered as having an upper end 55 and a lower end 57. The upper end 55 is provided with a hole 58 therethrough and for journaling the latch arm 52 on the pin 50. The second end 57 of the latch arm 52 is provided with an abutment surface 59 in abutting engagement with the abutment surface 30. It will thus be seen that by reason of the structure the latch arm is swingable to accommodate snap hook movement of the latch arm to automatically open and close the bite of the snap hook. The latch arm is provided with spring means 60 normally urging the abutment surfaces 59 and 30 into abutting engagement and in the preferred embodiment a pin 62 is provided adjacent the pin means 50 of the latch arm 50 extending into the recess 40 and about which the coil spring 60 is captivated with its inner end confronting the interior wall of the recess 63 which is preferably rcessed as at 65 to nest about the end of the spring, while the outer end of the spring 60 bears against a notch surface 70 in the latch arm located about the pin on which this coil spring is situated.

Figure 3:
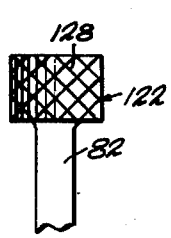
FIG. 3 is a view in cross section taken on the plane indicated by the line 3—3 and looking in the direction of the arrows.
Figure 4:
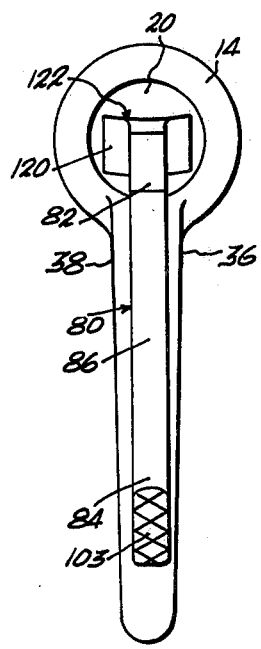
FIG. 4 is an end elevation view of the improved snap hook.

Referring now to the means for clampingly engaging a line passed through the eye of the hook, reference is made to FIG. 1 in which the keeper arm is generally designated by the numeral 80. The arm includes a first end 82 and a second end 84 extending from an intermediate zone 86 and, preferably, the ends diverge so that there is generally speaking an included angle of greater than 140 degrees and less than 170 degrees. From the intermediate zone a projection 90 extends into a recess 92 provided in the first leg portion and which is spanned by a second pin means 94 extending through a hole 96 in the projection to accommodate swinging movement as indicated by the arrowed line 99 of the keeper arm. Spring means 100 are provided to normally urge the keeper arm 80 into a predetermined position, generally as represented in FIG. 1 yet yieldable upon swinging movement as by force applied in the direction of the arrow 99 upon the enlarged or bulbous end 103 of the keeper arm. Referring to the upper end 82, it is seen that a foot 120 is provided which has a concave surface generally designated by the numeral 122 between an upper corner edge 124 and a lower bite edge 126. In the preferred embodiment this surface is knurled as shown in FIG. 3 and indicated by the numeral 128.

It is seen that in operation, the line L may be passed to the left in FIG. 1 without a problem; however, when the forces on the line tend to pull it through the eye to the right as shown in FIG. 1, the keeper arm will nestingly engage against the surface of the line with the knurled surface 128 building up friction as the force is continued to be applied drawing the corner or edge 124, which is the bite edge, into deeper and deeper biting relation, as shown in FIG. 1, of the line clampingly engaging it securely between the eye and the foot of the keeper arm. It will be understood that a line along the upper end of the keeper arm to the bite edge 124 is swingable depthwise generally, radially inwardly of a line as it is trapped in the eye.

The preferred embodiment illustrated includes the recesses described above and pin means captivatingly securing a coil spring thereabout. Additionally, clevis means connect the keeper arm to the hook and are of the type composed of the projection extending into the recess which is a preferred embodiment illustrated; however, other types of clevis arrangements may be utilized for this connection.

While the instant invention has been shown and described in a preferred embodiment, it is recongnized that departures can be made within the scope of the claims which are set forth hereinafter and, accordingly, this invention is to be awarded the full scope and spirit of the invention as set forth hereinafter in accordance with the doctrine of equivalence.

What is claimed is:

1. A snap hook comprising a body having a first end zone comprising an eye with an opening defining a line passageway and a second end zone comprising a J-hook portion, said hook portion and eye being connected together at a zone of juncture, said hook portion including a first leg portion extending generally axially away from said zone of juncture and said eye and a shorter second leg portion spaced from said first leg portion, and a generally U-shaped portion spaced from said zone of juncture between said leg portions and defining a hook bite, said second leg portion having a terminal end zone spaced from said zone of juncture and said terminal end zone having an abutment surface confronting said first leg portion, said zone of juncture having a first surface common with said first leg portion and a second opposite surface and a pair of outer surfaces extending between said first and second opposite surfaces, and said zone of juncture having a first recess in the second opposite surface between the outer surfaces and a first pin spanning said recess in perpendicular relation generally to said outer surfaces;

a latch arm of rigid material of a length greater than the distance between said first pin and said terminal end zone of said second leg portion and having a first end and a second end, said first end having a lateral hole sized for passage and rotatable on said first pin and said second end having an abutment surface in confronting engagement with the abutment surface of said terminal end zone of said second leg portion;

spring means normally urging said abutment surfaces into abutting engagement and said latch arm being yieldable swingably away from said second leg portion and toward said first leg portion to accommodate snap hook movement of said latch arm to automatically open and close the bite of the snap hook; and the improvement which resides in, said first leg portion having a first and second main surface common with the outer surfaces of said zone of juncture and a recess in the first surface common with said first surface of said zone of juncture and between said first and second main leg surfaces and second pin means spanning said recess, said second pin means having a centerline spaced from said eye opening a predetermined distance, a keeper arm having a first end and a second end and an intermediate zone between said first and second end, said keeper arm comprising a rigid member and including a projection extending from said intermediate zone and having a through hole, said projection and keeper arm being journaled on said second pin means, said second end of said keeper arm comprising an operator means for swinging movement of said keeper arm pivotally about said second pin means, spring means captivated between said keeper arm and said hook portion normally urging said keeper arm into a predetermined normal position, said first end of said keeper arm, when said keeper arm is in said perdetermined normal position being of a length from said second pin means at least as great as said predetermined distance to extend from said second pin means to said eye opening and said first end of said keeper arm having a terminal foot with an abutment surface confrontingly arranged in blocking relation at said eye opening and adapted to be moved into and out of clamping engagement of a line passed through said eye and yieldably movable upon swinging movement of said keeper arm to open passage through the eye to clampingly engage a line.

2. The device as set forth in claim 1 wherein said spring means normally urging said keeper arm in said first normal position comprises a pin on said second end of said keeper arm extending toward but not to said first leg portion of said hook portion and a coil spring captivated on said pin having a first end and a second end, said first end bearing against said first surface of said first leg portion of said hook portion and said second end bearing against said second end of said keeper arm.

3. The device as set forth in claim 1 wherein said foot comprises a concave surface defining a radius of curvature to abuttingly engage the outer surface of a line.

4. The device as set forth in claim 3 wherein said concave surface is provided with knurling to present a friction surface.

5. The device as set forth in claim 1 wherein said second end of said keeper arm is arcuately curved between said intermediate zone outwardly along said second end to conform to and overlay the first surface of the first leg portion of said hook portion in spaced relation therefrom.

6. The device as set forth in claim 5 wherein said second end of said keeper arm includes a terminal end and an enlarged zone on said terminal end for manipulation of said keeper arm.

7. The device as set forth in claim 1 wherein said first end of said keeper arm diverges with respect to said second end from said intermediate zone to provide minimal operating space.

8. The device as set forth in claim 1 wherein said foot extends laterally with respect to said first end of said keeper arm.

9. The device as set forth in claim 1 wherein said body, said latch arm, and said keeper arm are of corrosive, resistant, rigid material.

10. The device as set forth in claim 9 wherein said rigid material is bronze.

* * * * *